United States Patent
Beatson

(10) Patent No.: US 6,781,932 B2
(45) Date of Patent: Aug. 24, 2004

(54) METHOD AND APPARATUS FOR REDUCING NOISE IN A TRACKING ERROR SIGNAL

(75) Inventor: Trevor P. Beatson, Withington (GB)

(73) Assignee: LSI Logic Corporation, Milpitas, CA (US)

(*) Notice: Subject to any disclaimer, the term of this patent is extended or adjusted under 35 U.S.C. 154(b) by 521 days.

(21) Appl. No.: 09/867,052

(22) Filed: May 29, 2001

(65) Prior Publication Data

US 2002/0064106 A1 May 30, 2002

(51) Int. Cl.[7] .................................................. G11B 7/00
(52) U.S. Cl. ................................ 369/44.41; 369/44.32
(58) Field of Search .......................... 369/44.28, 44.27, 369/44.41, 44.42, 44.32

(56) References Cited

U.S. PATENT DOCUMENTS 6,208,604 B1 * 3/2001 Ishibashi et al. .......... 369/59.17

* cited by examiner

Primary Examiner—Nabil Hindi
(74) Attorney, Agent, or Firm—Christopher P. Maiorana, P.C.

(57) ABSTRACT

An apparatus (22) for reducing noise in a tracking error signal receives input signals from an array (5) of photodetectors, each input signal indicating the amount of laser light incident on the corresponding photodetector reflected from an optical disc. The input signals from diagonal pairs of photodetectors are summed and then filtered and digitized to produce a pair of digital input signals. A signal difference generator (20) produces first and second difference signals when either the first or the second digital input signals are received. The first and second difference signals are received by a programmable timing element having a user programmable device (41) and a signal limiting device (32, 33, 34, 35) for limiting the duration of the first or second difference signals provided at respective first or second outputs of the programmable timing element to a user programmable maximum value. The duration limited first or second difference signals are coupled to a charge pump (38) to provide a tracking error signal at an output.

20 Claims, 3 Drawing Sheets

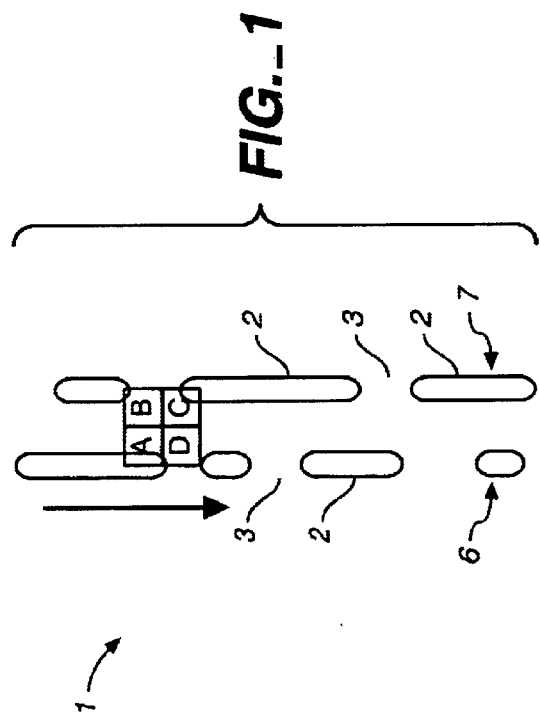
FIG._1
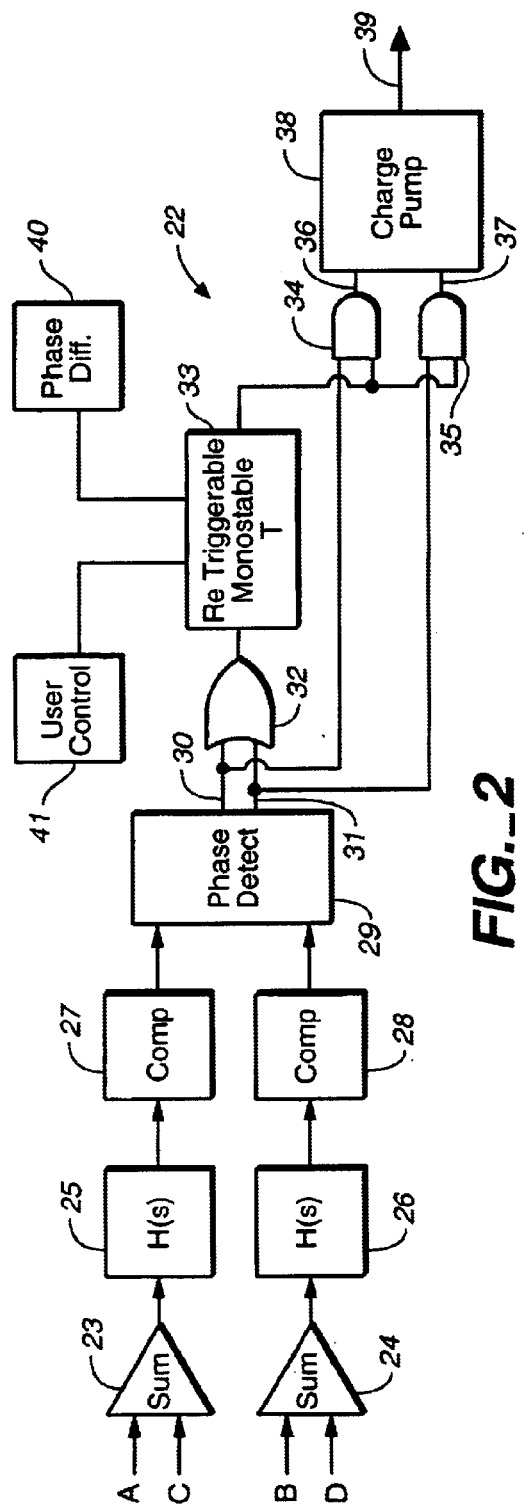
FIG._2

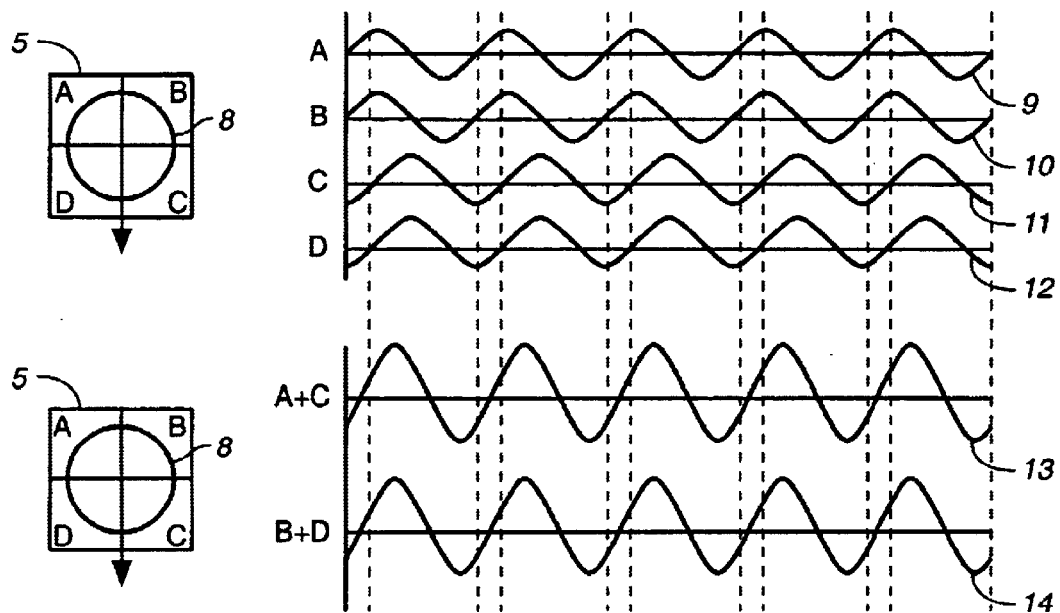
FIG._3a
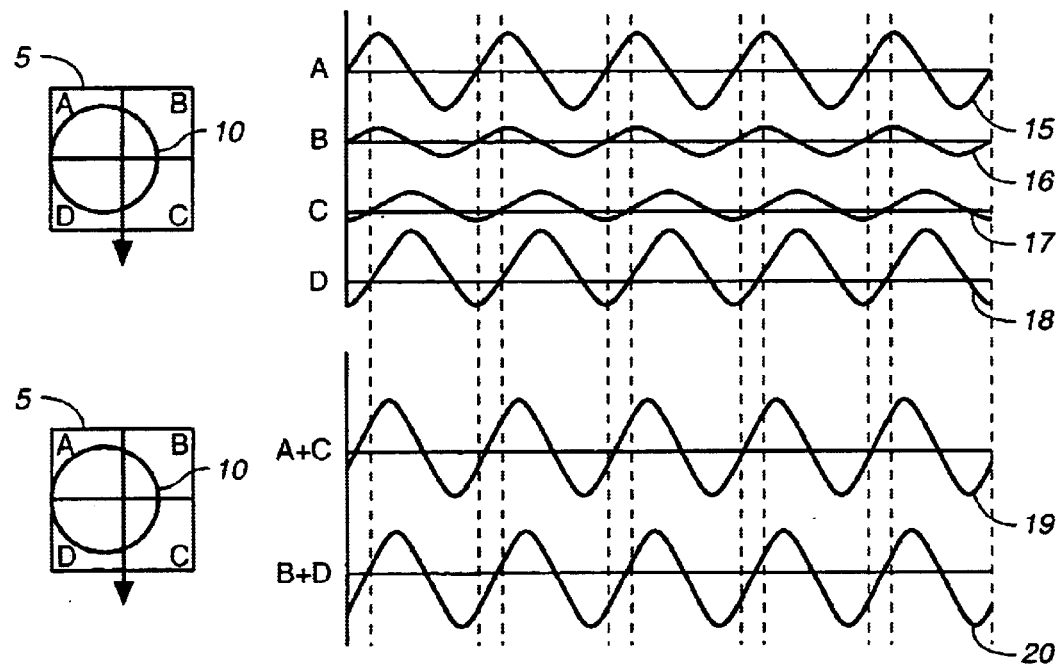
FIG._3b

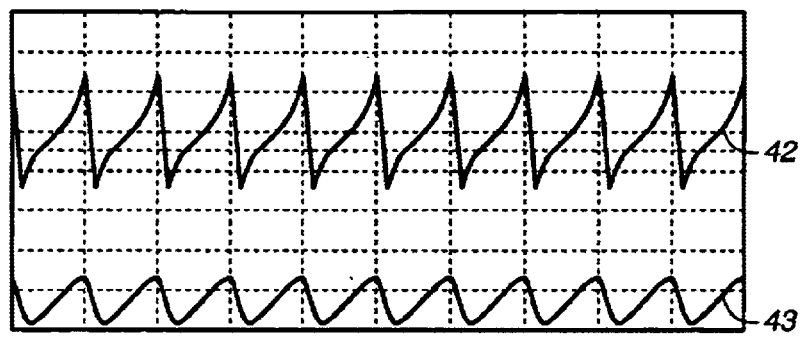
FIG._4
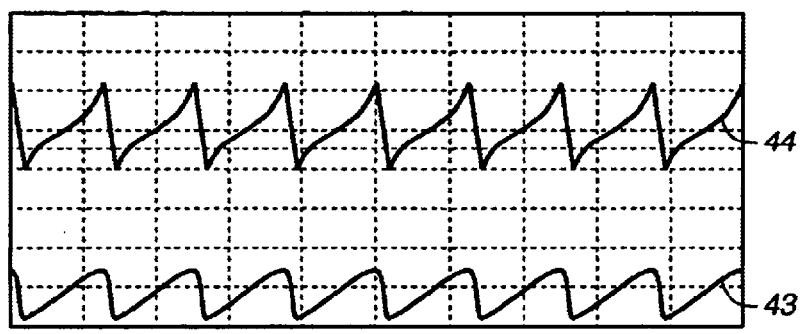
FIG._5a
FIG._5b
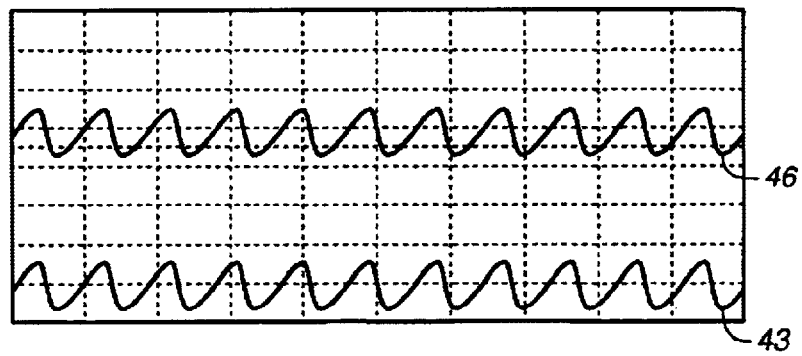
FIG._5c

METHOD AND APPARATUS FOR REDUCING NOISE IN A TRACKING ERROR SIGNAL

This application claims the benefit of United Kingdom Application No. 0029286.2 filed Nov. 30, 2000.

FIELD OF THE INVENTION

This invention relates to a method and apparatus for reducing noise in a tracking error signal, particularly, though not exclusively, for a Digital Versatile Disc (DVD) Read Only Memory (ROM) read system.

BACKGROUND OF THE INVENTION

In any optical storage mechanism involving rotating media, for example a Compact Disc (CD) or Digital Versatile Disc (DVD), it is usual for a laser to be used to read the data stored on tracks on the media. In order to accurately read the data it is common to provide a mechanism for sensing the position of the laser spot with respect to the tracks. The positional information can then be used to provide a control signal to adjust the laser position. A servo control loop can be established to ensure that the laser remains accurately positioned over the recorded data tracks, regardless of any random or systematic disturbances which are unavoidable in any practical system. When performing a continuous read operation, the laser position needs to be continuously adjusted in order to follow the track as it spirals from in the inner to the outer diameter of the disc.

The signal from the circuitry that senses the laser position is often called the Tracking Error (TE) signal. The function of the TE signal being to sense errors in the laser position and to correct for them. The same signal can also be used to indicate when tracks are being crossed. The signal is also used when the laser is required to seek across many tracks to recover data from another region of the disc.

Sometimes, while carrying out a track jump or seek operation, the TE signal can become quite noisy. In particular, when the laser is positioned midway between two tracks, the TE signal can have a relatively high spike. The introduced noise is undesirable, especially when the TE signal is to be applied to a charge pump, as is common in many ROM tracking error circuit implementations. Furthermore, a noisy TE signal can often cause problems with track counting.

SUMMARY OF THE INVENTION

The present invention therefore seeks to provide a method and apparatus for reducing noise on a tracking error signal, which overcomes, or at least reduces the above-mentioned problems of the prior art.

Accordingly, in a first aspect, the invention provides a method of reducing noise in a tracking error signal, comprising the steps of receiving at least two digital input signals from an array of at least two optical detectors, each digital input signal indicative of the amount of laser light incident on the corresponding optical detector reflected from an optical disc, generating a first difference signal when only the first digital input signal is received and a second difference signal when only the second digital input signal is received, detecting when either the first difference signal or the second difference signal is generated, maintaining first or second charging signals while either the first difference signal or the second difference signal is detected, limiting the duration for which the first and second charging signals are maintained to a maximum duration, the maximum duration being programmable according to at least user defined criteria, and generating a tracking error signal from the first and second charging signals.

In one embodiment, the step of detecting when either the first difference signal or the second difference signal is generated comprises the step of XORing the first difference signal and the second difference signal to provide a detection signal.

In one example, the step of limiting the duration for which the first and second charging signals are maintained to a maximum duration comprises the steps of generating a control signal when either the first difference signal or the second difference signal is detected, limiting the generation of the control signal to a duration which is received from a user, and combining the control signal with each of the first and second difference signals to maintain the first or second difference signals only while the control signal is generated.

The maximum duration is preferably further automatically adjusted for a changing data rate in the received at least two digital input signals so as to maintain a predetermined phase difference between the at least two digital input signals. Conveniently, the maximum duration is programmable by the user to change the predetermined phase difference. In one embodiment, the maximum duration is programmable by the user to adjust the predetermined phase difference according to how noisy the at least two digital input signals are so as to reduce noise on the tracking error signal.

In one example, the at least two digital input signals are generated from a 2×2 array of four optical detectors, the at least two digital input signals being generated by summing output signals from diagonal pairs of optical detectors.

According to a second aspect, the invention provides an apparatus for reducing noise in a tracking error signal. The apparatus comprising at least two digital input terminals, a signal difference generator, a programmable timing element and a charge pump for receiving at least two digital input signals from an array of at least two optical detectors. Each digital input signal indicative of the amount of laser light incident on the corresponding optical detector reflected from an optical disc. The signal difference generator having first and second inputs coupled to respective ones of the at least two digital input terminals, a first output for providing a first difference signal when only the first digital input signal is received and a second output for providing a second difference signal when only the second digital input signal is received. The programmable timing element having first and second inputs coupled respectively to the first and second outputs of the signal difference generator, at least a user programmable input, and first and second outputs. The programmable timing element further includes a signal limiting device coupled to the user programmable device for limiting a duration of the first or second difference signals provided at the respective first or second outputs to a user programmable maximum value. The charge pump having first and second inputs coupled respectively to the first and second outputs of the programmable timing element to provide a tracking error signal at an output thereof.

In another embodiment, the programmable timing element comprises a detecting element having first and second inputs coupled respectively to the first and second outputs of the signal difference generator and an output to provide a signal indicating when either the first difference signal or the second difference signal is received.

In one example, the detecting element comprises an XOR gate having a pair of inputs coupled to the outputs of the signal difference generator for receiving the first difference signal and the second difference signal and an output for providing a detection signal when either the first difference signal or the second difference signal is received.

The programmable timing element preferably comprises a control signal generator having a first input coupled to the output of the XOR gate, a second input coupled to the user programmable input, and an output for providing a control signal limited to a maximum duration which is determined by a user, and a combining element comprising a first portion having first and second inputs respectively coupled to the signal difference generator and a third input coupled to the output of the control signal generator and an output for providing the first or second difference signals as controlled by the control signal.

In one example, the programmable timing element comprises a further input for receiving a signal which automatically adjusts the maximum duration of the control signal for a changing data rate in the received at least two digital input signals so as to maintain a predetermined phase difference between the at least two digital input signals. The maximum duration of the control signal is preferably programmable by the user to change the predetermined phase difference. The maximum duration is conveniently programmable by the user to adjust the predetermined phase difference according to how noisy the at least two digital input signals are so as to reduce noise on the tracking error signal.

In one embodiment, the at least two digital input signals are generated from a 2×2 array of four optical detectors, the at least two digital input signals being generated by summing output signals from diagonal pairs of optical detectors.

BRIEF DESCRIPTION OF THE DRAWINGS

One embodiment of the invention will now be more fully described, by way of example, with reference to the drawings, of which:

FIG. 1 shows a schematic diagram of a laser photodiode array passing over an optical disc between two data tracks thereon;

FIG. 2 shows a schematic block diagram of an apparatus for generating a tracking error according to one embodiment of the present invention;

FIG. 3 shows schematically the signals for the photodiode array of FIG. 1 both when the laser is on track and off track;

FIG. 4 shows a conventional noisy tracking error signal and a filtered noisy tracking error signal; and FIGS. 5(a)–(c) shows tracking error signals similar to those of FIG. 4, but as generated by the apparatus of FIG. 2.

DETAILED DESCRIPTION OF THE PREFERRED EMBODIMENTS

Thus, as shown in FIG. 1, an optical storage disc 1 conventionally stores data as regions of high reflectivity 2 and low reflectivity 3 to incident laser light. Changes in intensity of the laser light reflected from the regions are detected by an array 5 of photodiodes, generating a signal from which the data can be recovered. The regions of high reflectivity 2 and low reflectivity 3 are arranged as tracks, of which two tracks 6 and 7 are shown, which spiral around the disc. Data is coded by varying the physical length of the high and low reflectivity regions 2 and 3. For example, in DVD systems, the shortest pattern is known as a 3T and the longest pattern is a 14T. The disc 1 rotates in the direction of arrow 4 such that the position of the laser and the photodiode array moves with respect to the data. When performing a continuous read operation, the laser position needs to be continuously adjusted in order to follow the track it is reading as the laser position spirals from in the inner to the outer diameter of the disc.

The photodiode array 5 is, in many standard systems, a 2×2 array of photodiodes A, B, C and D. When the array 5 is correctly centred over a track, the signals from each of the first two photodiodes A and B will be substantially equal and will be advanced in phase as compared to the signals from the second two photodiodes C and D. However, when it is required to move the laser to another part of the disc to read another part of the data, for example, a different scene in a film recorded on the DVD, then the laser and photodiode array 5 will be, at times, positioned halfway between two tracks, as shown in FIG. 1. Under these circumstances, the left and right hand photodiodes are actually receiving data from different tracks, such that (as shown) there may be a data region incident on photodiode A, but not photodiode B, and on photodiode C, but not photodiode D.

FIG. 3 shows the signals from the four photodiodes A, B, C and D when the laser is correctly aligned with the track, so that the reflected spot is over the center of the array (FIG. 3(a)), and when the laser is incorrectly aligned with the recorded track, such that the reflected spot is shifted to the left (FIG. 3(b)). For simplicity, the signals from the photodiodes A, B, C and D are shown as sinusoids, which is approximately the signal for a repeated 3T pattern of data.

As shown in FIG. 3(a), with the laser correctly on track, the reflected spot 8 is centered on the photodiode array 5 and the signals 9, 10, 11 and 12, from photodiodes A, B, C and D, respectively, are approximately equal in amplitude. However, the signals from photodiodes A and B are phase advanced with respect to the signals from photodiodes C and D, the phase advancement being exaggerated in FIG. 3 for clarity. Since the reflected light is incident on the leading pair of diodes A and B, as the disc rotates and the recorded data passes the photodiode array 5, the phase difference is a function of the physical size of the photodiodes and the speed of the rotating disc. However, for a correctly centered laser, the sum 13 of signals 9 and 11 from the diagonal pair of photodiodes A and C and the sum 14 of signals 10 and 12 from the diagonal pair of photodiodes B and D, will nevertheless be identical and no resultant phase difference will be detected.

Where the laser is not correctly aligned with the track, as shown in FIG. 3(b), such that the reflected spot 10 is not centered on the photodiode array 5, photodiodes A and D receive more reflected light than photodiodes B and C. As a result, the amplitude of the signals 15 and 18, from photodiodes A and D, respectively, increases, and the amplitude of the signals 16 and 17, from photodiodes B and C, respectively, decreases. The phase difference due to the physical separation of the leading pair of diodes A and B compared to the trailing pair of photodiodes C and D nevertheless stays the same. However, the sum 19 of signals 15 and 17 from the diagonal pair of photodiodes A and C and the sum 20 of signals 16 and 18 from the diagonal pair of photodiodes B and D, will now have a resultant phase difference. This is because the sum 19 contains a larger component of signal 15 from the phase advanced leading photodiode A and a smaller component of signal 17 from the phase retarded trailing photodiode C. Conversely, the sum 20 contains a smaller component of signal 16 from the phase advanced leading photodiode B and a larger component of signal 18 from the phase retarded trailing photodiode C. As a result, the sum 19 is phase advanced with respect to sum 20 and the phase difference is detectable and results in a displacement of the Tracking Error (TE) signal from its normally balanced condition. The magnitude of the displacement is a measure of the extent to which the laser is off track and the direction of the displacement indicates whether the laser is off track to the left or the right. This information can then be used by a tracking error servo loop to return the laser to its correct position aligned on the track.

Turning now to FIG. 2, an apparatus 22 for generating a tracking error according to one embodiment of the present invention is shown. The apparatus 22 includes two high speed amplifiers 23 and 24. The first high speed amplifier 23 receives signals from the diagonal pair of photodiodes A and C and sums them to provide a sum signal at its output. The second high speed amplifier 24 receives signals from the diagonal pair of photodiodes B and D and sums them to provide a sum signal at its output. The outputs of the first and second high speed amplifiers 23 and 24 are coupled to high pass filters 25 and 26, respectively, where the sum signals are equalized in accordance with the transfer function published in the DVD ROM standard, or any other desired transfer function. This helps to maintain the signal amplitude for all input frequencies. The outputs of the two equalizers 25 and 26 are coupled to respective comparators 27 and 28, where the analog equalized sum signals are sliced to produce digital signals which are passed to a phase detector 29. The phase detector produces a pair of digital signals at two outputs 30 and 31. Typically, these signals are coupled to a charge pump to positively or negatively charge the charge pump, according to whether the phase difference is positive or negative. The first digital signal has a duration indicating when the phase detector detects that the phase difference between the sum signals is positive and the second digital signal has a duration indicating when the phase detector detects that the phase difference between the sum signals is negative.

In the present embodiment of the invention, the outputs 30 and 31 of the phase detector 29 are coupled to an XOR gate 32. The XOR gate 32 produces a positive output only when the two inputs are different (e.g., when either phase difference is detected to be either positive or negative, but not zero). The output of the XOR gate 32 is passed to a re-triggerable monostable 33 and is used to trigger the monostable 33. The output of the monostable 33 is a pulse of programmable width T, which is programmable from a pair of inputs 34 and 35 to the monostable 33. The output pulse from the monostable 33 is coupled to a first input of each of a pair of AND gates 34 and 35. The other input of AND gate 34 is coupled to output 30 of the phase detector 29 and the other input of AND gate 35 is coupled to the output 31 of phase detector 29. Thus, the output 36 of AND gate 34 is high when the output of the monostable 33 is high (e.g., for the duration of the programmable pulse and when the first digital signal at output 31 of phase detector 29 is high, indicating that the phase difference between the sum signals is positive). The programmable pulse therefore serves to limit the time during which the digital signal is maintained at the output of the AND gate 34 to a maximum duration which is determined by the programming of the pulse width. The output of the AND gate 34 is passed to a charge pump 38 to positively charge the charge pump. Similarly, the output 37 of AND gate 35 is high when the output of the monostable 33 is high (e.g., for the duration of the programmable pulse and when the second digital signal at output 32 of phase detector 29 is high, indicating that the phase difference between the sum signals is negative). The output of the AND gate 35 is also passed to the charge pump 38 to negatively charge the charge pump. Thus, the outputs 36 and 37 of the AND gates 34 and 35 act in the same way as the digital signals at the two outputs 30 and 31 of the phase detector 29 in known systems, except that their duration can be limited to a maximum value. The output 39 of the charge pump 38 provides the tracking error control signal.

The maximum width of the output pulse of the monostable 33 is automatically adjusted by a phase difference control device 40 which adjusts the width of the pulse to maintain a constant maximum phase difference of, for example 90°. It will be appreciated that if it is desired to maintain a fixed maximum phase difference, then the pulse width will need to be adjusted according to the position of the laser on the disc since the data rate will vary according to the radius of the track for a constant disc rotation speed. This adjustment is carried out in any desired manner by the phase difference control device 40. Thus, for up or down pulses less than the period for which the monostable has been programmed, the outputs 36 and 37 to the charge pump 38. Should an incoming up or down pulse exceed the programmed period of the monostabel 33, corresponding to a phase difference greater than the prescribed limit, the monostable will time out. If this occurs, the up or down pulse to the charge pump will be limited to the pulse width T programmed into the monostable 33.

The maximum width of the output pulse of the monostable 33 is also programmable by a user control 41 (either manually or by a processor controlling a system in which the apparatus is incorporated) in order to change the maximum phase difference allowed according to other circumstances, such as, for example, if there are large errors in the phase comparisons, perhaps because of dirt on the disc.

As mentioned above, the tracking error signal is determined using signals indicating the phase difference between the signals from the sum of diagonal pairs of photodiodes (A+C) and (B+D). Looking at the scenario illustrated in FIG. 1, where the array 5 is midway between tracks, the data patterns on adjacent tracks are uncorrelated, such that the phase difference can be large. When the large phase differences are presented to the phase detector and the charge pump circuitry, they can cause excessive movements in the tracking error signal. This results in a noisy TE waveform during the times when the laser is maximally off track, as shown in waveform 42 of FIG. 4. The lower waveform 43 in FIG. 4 shows a more acceptable waveform for a track find operation. A noisy tracking error signal can degrade the performance of the tracking servo loop and can also cause problems with track counting during track find operations. It will be appreciated that the sawtooth waveform, which indicates that adjacent tracks are being passed over, can be used for track counting, in order to facilitate finding a required track on the disc.

The excessive noise on the TE signal can be considerably reduced by using the embodiment of the invention described above to limit the maximum phase differences which are allowed to be presented to the charge pump circuitry. FIG. 5(a) shows a similar TE waveform 44 to that of FIG. 4, but with the maximum phase difference allowable on the TE output being programmed to 90°. Similarly the TE waveforms 45 and 46 in FIGS. 5(b) and (c) have the maximum phase difference programmed to 54° and 36°, respectively. The reduction in noise, indicated by sharp spikes due to large phase differences, is clearly shown. It will be appreciated that the maximum allowable phase difference should be programmable by a user to cater for different circumstances for different discs. For example, some discs may be dirtier than others, which can give rise to large, spurious, phase differences being detected, such that a smaller maximum allowable phase difference might be required. Furthermore, different discs may have different track spacings which can also affect the detected phase differences. The main objective is to limit the maximum duration of up and down pulses to the charge pump, irrespective of the actual implementation of the circuitry, to prevent excessive movement of the TE output in the presence of large erroneous phase comparisons. Thus, although one particular implementation was described above with reference to FIG. 2, a number of other circuit implementations are possible. For example, in one integrated circuit design, a programmable delay line and some additional control circuitry can be used to implement the variable pulse width re-triggerable monostable block.

It will be appreciated that although only one particular embodiment of the invention has been described in detail, various modifications and improvements can be made by a person skilled in the art without departing from the scope of the present invention.

What is claimed is:

1. A method of reducing noise in a tracking error signal, comprising the steps of:
   (A) generating a first difference signal when a first digital input signal is received and a second difference signal when a second digital input signal is received;
   (B) maintaining first or second charging signals while either the first difference signal or the second difference signal is detected;
   (C) limiting the duration for which the first and second charging signals are maintained to a maximum duration; and
   (D) generating a tracking error signal from the first and second charging signals.

2. The method according to claim 1, wherein each digital input signal is indicative of the amount of laser light incident on an optical detector reflected from an optical disk.

3. The method according to claim 1, wherein said maximum duration is programmable according to at least user defined criteria.

4. The method according to claim 1, further comprising:
   (E) detecting when either the first difference signal or the second difference signal is generated.

5. The method according to claim 4, wherein step (E) further comprises:
   XORing the first difference signal and the second difference signal to provide a detection signal.

6. The method according to claim 1, wherein step (C) further comprises:
   generating a control signal when either the first difference signal or the second difference signal is detected;
   limiting the generation of the control signal to a duration which is received from a user; and
   combining the control signal with each of the first and second difference signals to maintain the first or second difference signals only while the control signal is generated.

7. The method according to claim 1, wherein step (C) further comprises:
   automatically adjusted for a changing data rate in the received at least two digital input signals so as to maintain a predetermined phase difference between the at least two digital input signals.

8. The method according to claim 7, wherein the maximum duration is programmable by the user to change the predetermined phase difference.

9. The method according to claim 8, wherein the maximum duration is programmable by the user to adjust the predetermined phase difference according to how noisy the at least two digital input signals are so as to reduce noise on the tracking error signal.

10. The method according to claim 1, wherein the first and second digital input signals are generated from a 2×2 array of four optical detectors, the first and second digital input signals being generated by summing output signals from diagonal pairs of optical detectors.

11. Apparatus for reducing noise in a tracking error signal, the apparatus comprising:
   a signal difference generator having first and second inputs each coupled to respective one at least two digital input terminals, a first output for providing a first difference signal and a second output for providing a second difference signal;
   a programmable timing element having first and second inputs coupled respectively to the first and second outputs of the signal difference generator and first and second outputs; and
   a charge pump having first and second inputs coupled respectively to the first and second outputs of the programmable timing element to provide a tracking error signal at an output thereof.

12. The apparatus according to claim 11, wherein each digital input signal indicative of an amount of laser light incident on a corresponding optical detector reflected from an optical disc.

13. The apparatus according to claim 11, wherein the programmable timing element further includes a signal limiting device coupled to a user programmable device for limiting a duration of the first or second difference signals provided at the respective first or second outputs to a programmable maximum value.

14. The apparatus according to claim 11, wherein the programmable timing element comprises a detecting element having first and second inputs coupled respectively to the first and second outputs of the signal difference generator and an output to provide a signal indicating when either the first difference signal or the second difference signal is received.

15. The apparatus according to claim 14, wherein the detecting element comprises an XOR gate having a pair of inputs coupled to the outputs of the signal difference generator for receiving the first difference signal and the second difference signal and an output for providing a detection signal when either the first difference signal or the second difference signal is received.

16. The apparatus according to claim 15, wherein the programmable timing element comprises:
   a control signal generator having a first input coupled to the output of the XOR gate, a second input coupled to the user programmable input, and an output for providing a control signal limited to a maximum duration; and
   a combining element comprising a first portion having first and second inputs respectively coupled to the signal difference generator and a third input coupled to the output of the control signal generator and an output for providing the first or second difference signals as controlled by the control signal.

17. The apparatus according to any one of claim 16, wherein the programmable timing element comprises a further input for receiving a signal which automatically adjusts the maximum duration of the control signal for a changing data rate in the received at least two digital input signals so as to maintain a predetermined phase difference between the at least two digital input signals.

18. The apparatus according to claim 17, wherein the maximum duration of the control signal is programmable by the user to change the predetermined phase difference.

19. The apparatus according to claim 17, wherein the maximum duration is programmable by the user to adjust the predetermined phase difference according to how noisy the at least two digital input signals are so as to reduce noise on the tracking error signal.

20. The apparatus according to claim 11, wherein the at least two digital input signals are generated from a 2×2 array of four optical detectors, the at least two digital input signals being generated by summing output signals from diagonal pairs of optical detectors.

* * * * *